United States Patent [19]

Hartheimer et al.

[11] Patent Number: 5,305,200
[45] Date of Patent: Apr. 19, 1994

[54] FINANCIAL EXCHANGE SYSTEM HAVING AUTOMATED RECOVERY/ROLLBACK OF UNACKNOWLEDGED ORDERS

[75] Inventors: Richard Hartheimer, Morris Plains, N.J.; Michael Coleman, Sydney, Australia; Chris Klepka, Parsippany, N.J.; Geoffrey Poole, Sydney, Australia

[73] Assignee: Foreign Exchange Transaction Services, Inc., Long Island City, N.Y.

[21] Appl. No.: 608,643

[22] Filed: Nov. 2, 1990

[51] Int. Cl.⁵ .................... G06F 15/21; G07G 1/12
[52] U.S. Cl. .................... 364/408; 364/401; 364/800; 364/DIG. 1; 235/379; 235/380
[58] Field of Search ............ 364/408, 200, 800, 401; 235/379, 380

[56]  References Cited

U.S. PATENT DOCUMENTS 5,051,892  9/1991  Ferree et al. .................... 364/200
5,136,716  8/1992  Harvey et al. .................... 395/800

OTHER PUBLICATIONS

"Quotron F/X Trader System Overview" 1990, Quotron Systems, Inc.
"Quotron F/X Trader System Administration Manual", 1990, Quotron Systems, Inc.
Quotron Systems, Inc., "Interactive Demo Script", with copies of display screens as shown in Lisbon, Portugal, Spring/Summer 1989.

Primary Examiner—Donald E. McElheny, Jr.
Assistant Examiner—Gita D. Shingala
Attorney, Agent, or Firm—Robbins, Berliner & Carson

[57] ABSTRACT

A distributed processing on-line automated trading system uses structured messages to represent each stage in the negotiation between a market maker (quoter) and a potential buyer or seller (requestor). Such a system is subject to uncertainties caused by the fact that a variable time is required for an order (buy or sell) message to be transmitted from the requestor to the quoter, or for a cancel (quote interrupt) message to be transmitted from the quoter to the requestor. Furthermore, it is possible that an equipment failure in the network, either in a communication link or even at the workstation of one of the traders, will prevent a small fraction of such order messages and cancel messages from reaching their intended destination within the relatively short timeframe typically associated with an on-line transaction system. An electronic log maintained by the quoter's workstation provides a reliable and impartial mechanism for automatically verifying whether an order was actually received by the quoter, and for thereby resolving whether the quoter is committed to accept an order that was placed during the small (typically only a few seconds) window of uncertainty after an order is placed and before the requestor would have been notified that the order was accepted or the quote was interrupted or a failure had occurred in the relevant communication link. In addition, the system regularly reviews a second transaction log maintained by the requestor's workstation for any "doubtful" transactions (i.e., those designated as "order in process" for more than a few minutes), including "doubtful" transactions which were not resolved when any network failure message was originally received, and those which were the result of a failure associated with the requestor's workstation.

11 Claims, 8 Drawing Sheets

FINANCIAL EXCHANGE SYSTEM HAVING AUTOMATED RECOVERY/ROLLBACK OF UNACKNOWLEDGED ORDERS

TECHNICAL FIELD

The present invention relates generally to electronic processing of financial transactions over a communications network, and more particularly to distributed processing systems capable of resolving or eliminating any discrepancies in transaction records maintained at different nodes of the communications network.

CROSS-REFERENCE TO RELATED APPLICATIONS

For a more comprehensive view of what is presently regarded as the best mode of practicing the invention and its intended environment, reference should be made to the following commonly assigned U.S. patent applications filed concurrently herewith on Nov. 2, 1990.

"Detection and prevention of Duplicate Trading Transactions over a Communications Network" (U.S. patent application Ser. No. 07/608,647) now U.S. Pat. No. 5,258,908

"Activation of Dormant Bank Node Processor" (U.S. patent application Ser. No. 07/608,644 now abandoned, which was continued in part under Ser. No. 07/612,045 filed on Nov. 9, 1990) allowed "Terminal for Automated Trading System having Streamlined User Interface" (U.S. patent application Ser. No. 07/608,645).

The following documents published by Quotron Systems, Inc. describe various aspects of a trading system which embodies many aspects of the present invention and which is available for commercial use under the trademark "F/X Trader":

"Quotron F/X Trader System Overview," Winter 1989/90.

"Quotron F/X Trader Beta Version User Manual," Spring 1990.

"Quotron F/X Trader Beta Version System Administration Manual," Spring 1990.

Copies of the foregoing documents are included as part of the above-cited application entitled "Detection and Prevention of Duplicate Trading Transactions Over a Communications Network" and are hereby incorporated by reference.

BACKGROUND ART

"Real time" communications networks are used for various types of financial transactions, and may involve network transit times of up to a few seconds after a particular message is transmitted by one party until it is received by the other party. In such networks, a pending transaction may be interrupted not only by the counterparty, but also as a result of a communications failure in the communications link connecting the two parties. Particularly in financial transactions involving large sums of money, a separate transaction record is maintained by each party. In that case, an interrupted transaction can result in a discrepancy between the relevant records maintained by the two parties, which usually had to be resolved by a careful manual review of each party's transaction logs.

Two-stage commitment protocols have been implemented in certain communication networks utilized by the banking industry for electronic fund transfers. Such a two-stage commitment regards a transaction as "doubtful" until each party's computer has confirmed that the transaction has been logged as "committed" by the counterparty's computer.

U.S. Pat. No. 4,525,779 (assigned to Reuters Ltd. and entitled "Conversational Video System") discloses a text oriented communication system for effecting foreign currency exchanges in which either party may transmit an electronic "DEAL" signal to his counterparty which is automatically answered by a "ACKNOWLEDGED" signal. If the transmitting party's transaction log shows a "DEAL" signal immediately followed by an ACKNOWLEDGED signal, this provides verification that any outstanding offer had not been withdrawn, and the communication link with his counterparty had not been interrupted before any text transmitted with or prior to the "DEAL" signal had been received by the counterparty. However, such a system requires the trader who initiated the transmission of the "DEAL" signal to monitor his on-screen transaction log and to request a manual review of the counterparty's transaction logs in the event that no "ACKNOWLEDGED" signal is received within a reasonable time (for example, as a result of a temporary failure in the communications link connecting the trader and his counterparty). Particularly in negotiations involving foreign currencies and other marketable securities that are sometimes subject to relatively large price movements over a relatively short period of time, uncertainty as to whether an offer had been accepted could subject the trader to considerable financial exposure.

There remains a need for a reliable and impartial automated exchange system which can automatically determine whether any offers were accepted (orders placed) during the small (typically only a few seconds) window of uncertainty between the time an outstanding offer is withdrawn (quote interrupted) and the time the person placing the order has been notified of the interruption, and, if there were any such orders, can automatically advise the party placing the order whether his counterparty was committed to accept the order.

SUMMARY OF THE INVENTION

An on-line automated trading system uses structured messages to represent each stage in the negotiation between a market maker (quoter) and a potential buyer or seller (requestor). Preferably, each dealer has a workstation that can display and process all relevant details of at least six such trading conversations simultaneously; the dealers are connected together by means of a redundant dedicated message routing network, with "bank node" processors and "city node" processors for higher level supervisory functions (including security, audit and maintenance), and report generation for subsequent offline processing associated with the overall system or a particular node thereof, such as security, audit and maintenance. Such a distributed processing system is subject to uncertainties caused by the fact that a variable time is required for an order (buy or sell) message to be transmitted from the requestor to the quoter, or for a cancel (quote interrupt) message to be transmitted from the quoter to the requestor. Furthermore, it is possible that an equipment failure in the network, either in a communication link or even at the workstation of one of the traders, will prevent a small fraction of such order messages and cancel messages from reaching their intended destination within the relatively short time-frame typically associated with an on-line transaction system (a maximum of 5-8 seconds to initiate, negotiate, and conclude a single transaction).

In accordance with a preferred embodiment of the invention, a two-stage commitment logging process is utilized. Before any order in response to an outstanding quote is communicated to the quoter, the requestor's workstation first verifies that its associated bank node processor has created a corresponding electronic transaction log entry designated "order in process". Similarly, as soon as the order message is received at the quoter's workstation and the workstation has verified that the quotation was not interrupted before the order message was received, a corresponding "quote committed" electronic transaction log entry is created at the quoter's bank node. The quoter's workstation then transmits a confirmation message to the requestor's workstation and the requestor's workstation causes the relevant transaction log entry at its bank node to be changed from "order in process" to "order committed".

By this means, the trading system may readily verify whether a particular transaction has been logged as "committed" by both parties, in which case there is no doubt as to whether the order has been made and accepted.

In accordance with one aspect of the present invention, this automated two-stage commitment provides a reliable and impartial mechanism for resolving whether the quoter is committed to accept an order that was placed during the small (typically only a few seconds) window of uncertainly between the time an outstanding quotation is interrupted and the time the requestor is notified of the interruption. In particular, if the order message was not received until after the quote was interrupted, the quoter's workstation so informs the requestor's workstation, which in turn causes the "order in process" log entry to be updated to "order rolled back". On the other hand, as soon as a corresponding order message has been received at his workstation, the quoter is inhibited from interrupting the quote and the order is processed in the normal fashion as described previously.

Moreover, assuming that the relevant electronic transaction log at the quoter's bank node has not been removed or rendered unreadable, many transactions which remain "doubtful" from the requestor's perspective for longer than a predetermined maximum network latency period can be readily resolved by merely reading the quoter's electronic transaction log to determine whether the transaction in question was "committed".

Preferably, in response to any system message indicating a network failure involving the communication link currently in use for an "order in process" transaction, the requestor's workstation initiates an immediate automatic recovery attempt by the requestor's bank node processor; if the requestor's bank node processor is able to establish an open communication link with the quoter's bank node processor, the status of the transaction is automatically resolved.

In addition to recovery attempts thus initiated by the workstation during a pending transaction, the bank node processor preferably regularly reviews all its transactions logs for any "doubtful" transactions which have remained designated as "order in process" for more than a few minutes (including "doubtful" transactions which were not resolved when any network failure message was originally received, and those which were the result of a failure associated with the requestor's workstation). For each of these remaining "doubtful" transactions, the requestor's bank node processor attempts to establish a communication link with the quoter's bank node processor, and, if successful, proceeds as outlined previously.

BRIEF DESCRIPTION OF THE DRAWINGS

Other objects and features of the present invention will be apparent from the following description of a presently preferred embodiment taken in connection with the accompanying drawings, in which.

DETAILED DESCRIPTION OF THE PREFERRED EMBODIMENT

Figure 1:
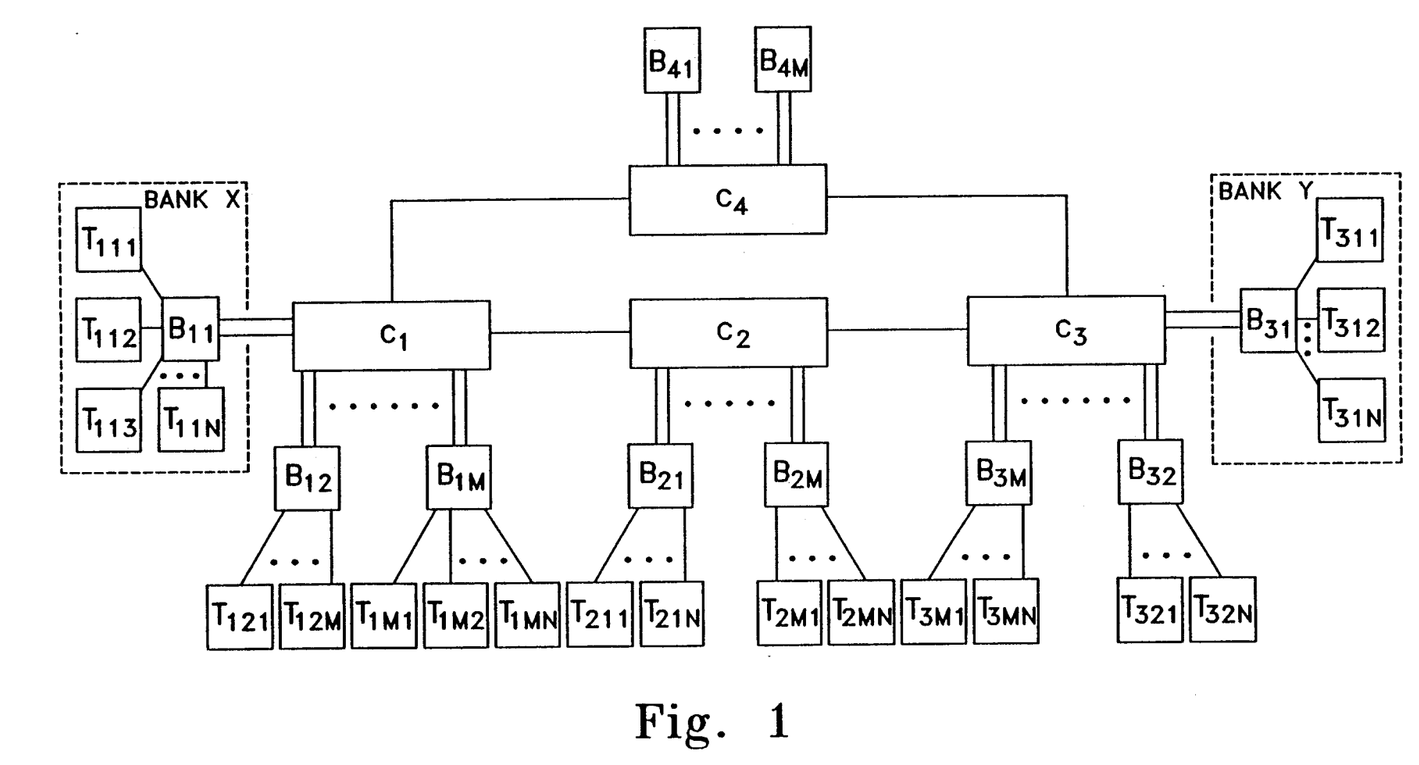
FIG. 1 is an overview of a communications network for a foreign exchange trading system.

Referring initially to FIG. 1, an exemplary network of trading terminals is shown. The network comprises a plurality of city nodes C1 to C4, each connected to at least one bank node B11 to B4M. Each bank node is in turn connected to at least one trading terminal T111 to T3MN. The bank and city nodes generally provide a routing network and supervisory functions to allow a trading terminal connected to one bank node to communicate with a trading terminal (or trading terminals) connected to another bank node. The city nodes may be located in any city, and the city nodes may be connected in any combination necessary to facilitate the routing of calls from city to city and from bank node to bank node. For example, the city nodes may be located in the cities indicated in FIG. 1 wherein city node C1 is located in Tokyo, city node C2 in New York, city node C3 in Zurich and city node C4 in London.

The route over which messages are routed is invisible to the traders using the trading terminal. For example, a foreign exchange trader using the trading terminal T111 in Bank X in Tokyo can communicate with a foreign trader using the terminal T311 at Bank Y in Zurich. The message from Bank X to Bank Y initiates at terminal T111, is routed through the Bank X bank node B11, and then through the Tokyo city node C1. Upon receipt of the message at Bank Y, it gets routed to the Zurich city node, then to the Bank Y bank node B31, and finally to the trading terminal T311. The path that the message takes between the Tokyo C1 and Zurich C3 city nodes is entirely up to the decision making function of the network. For example, the message may go through New York C2 only, or London C4 only, or both New York and London before reaching Zurich.

In the above-referenced commercial embodiment, the terminals are IBM PS/2 personal computers utilizing an OS/2 operating system; the data processors at the bank nodes and city nodes are DEC VAX computers; the communications network uses a DECnet network control system to monitor the operation of the network and to interface with the application programs.

Figure 2:
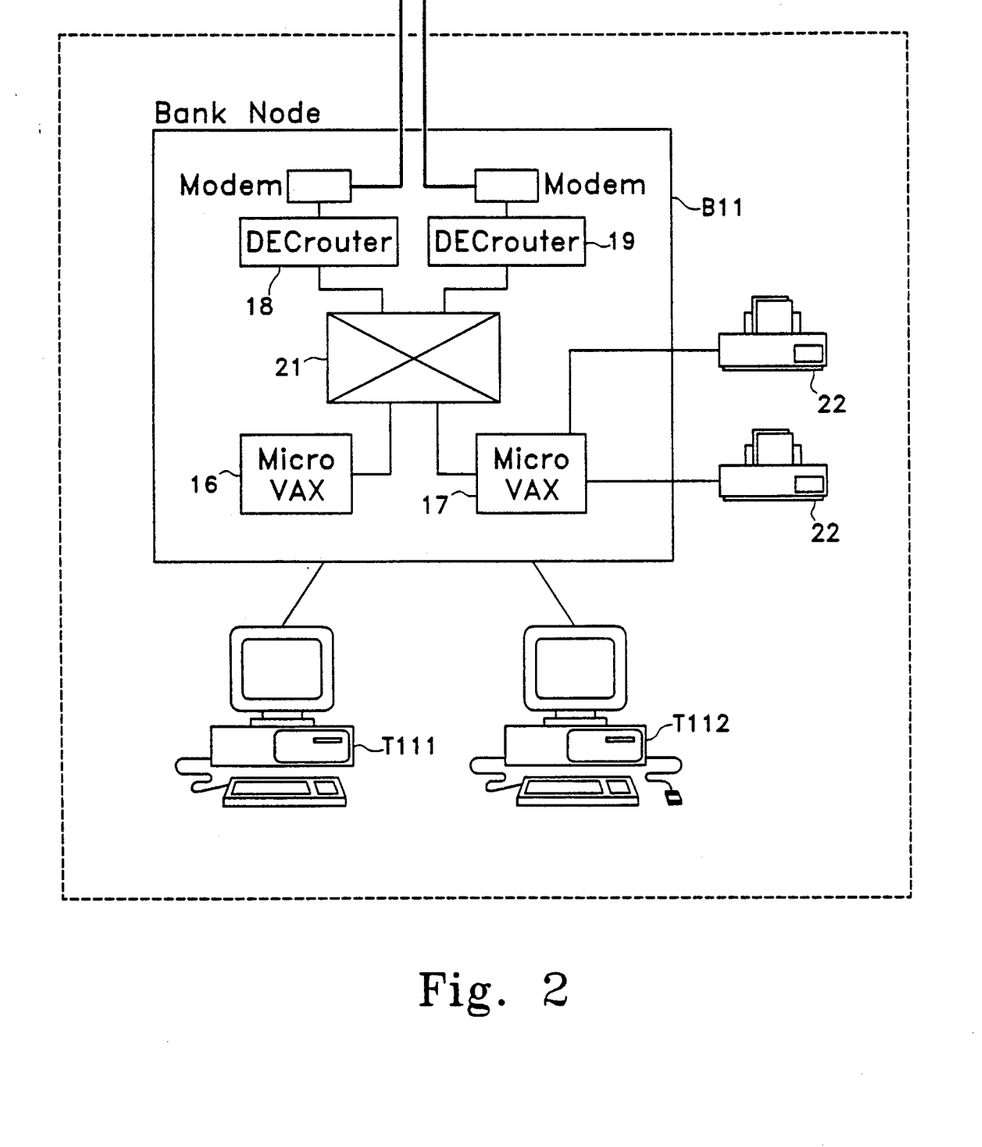
FIG. 2 is a simplified schematic view of a bank node of the communications network and its associated equipment.

As shown in FIG. 2, each bank node has two data processors (one active, the other operating in dormant mode), each with its own magnetic disk drive for providing non-volatile electronic storage of software, user preferences, and transaction records. It should be noted that both bank node data processors are connected directly to the communication network through a DECrouter network switch; accordingly, it is possible to establish a communications link to a particular bank node data processor even if one or more of its associated workstations is temporarily disconnected from the network.

As shown in FIG. 2, an exemplary duplex bank node B11 has a first and second sibling computer 16 and 17 respectfully (such as MicroVAX computers), a pair of routers 18 and 19 (such as DECrouter 200s) and a switch 21 (such as a DELNI). The function of each component is conventional. Briefly, the routers route signals to and from other nodes. The routers at the bank node route signals to and from a city node and to and from trading terminals corresponding to the bank node. The switch allows either sibling computer to connect with either router.

In addition to these components, the bank node comprises other conventional elements, such as at least one monitor and keyboard (not shown) for operating the sibling computers, modems 21 connected to the DECrouters for facilitating the input/output connection of the DECrouters to other nodes, and printers 22 connected to the sibling computers.

It should also be understood that each of the bank's two data processors (one active, the other operating in dormant mode) has its own magnetic disk drive for providing non-volatile electronic storage of software, user preferences, and transaction records. It should be noted that both bank node data processors are connected directly to the communication network through a DECrouter network switch; accordingly, it is possible to establish a communications link to a particular bank node data processor, and thus it is possible to access information in its associated magnetic disk drive, even if its sibling data processor or one or more of its associated workstations is temporarily disconnected from the network.

Figure 3:
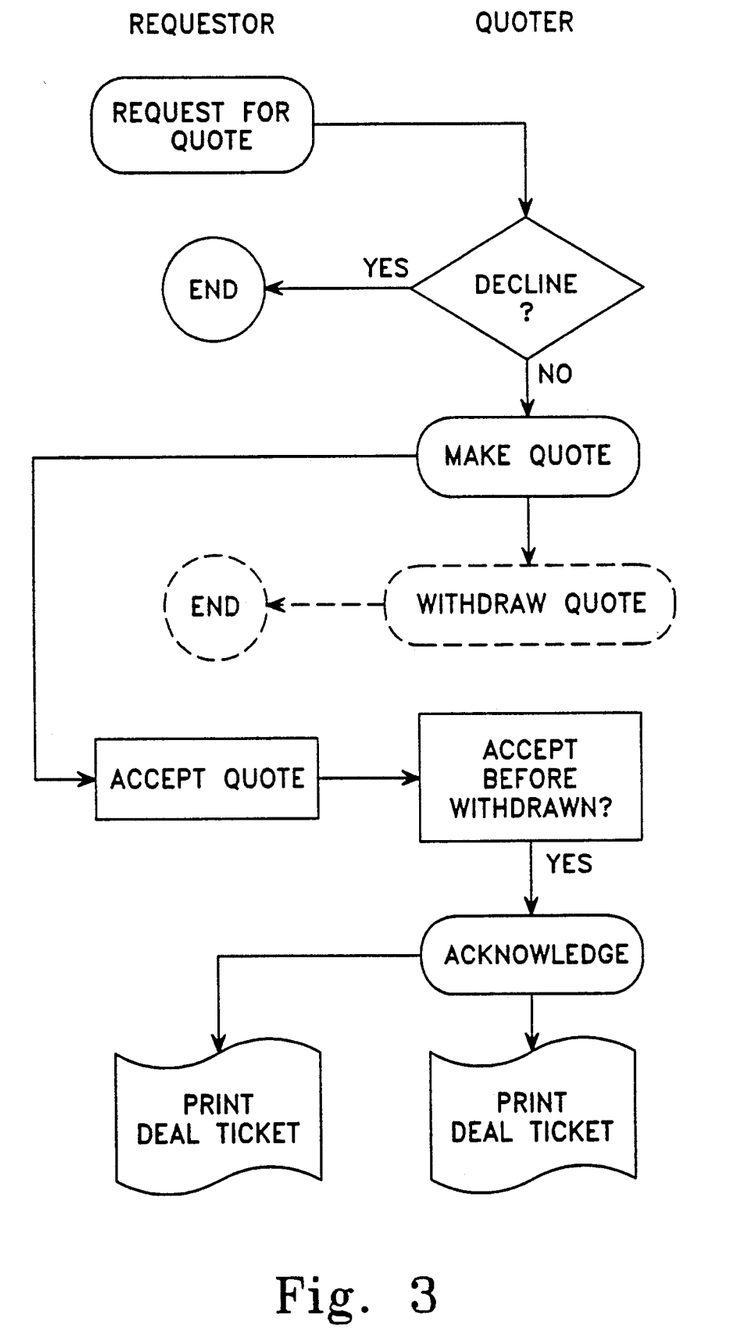
FIG. 3 is a process flow diagram showing a typical foreign exchange transaction.

Referring now to FIG. 3, it will be seen that a typical foreign exchange transaction commences with a Request for Quote, which is directed to a particular bank and which specifies the particular currency pair for which a quote is desired. Assuming the Trader answering the request does not Decline to Quote, he transmits a Quote back to the Requestor who is then free to Accept the quotation by making a firm Buy or Sell Order. Concurrently, the Quoter is free to Withdraw his Quote, at least until a firm order is received from the Requestor. Once the firm order is received, and assuming the Quoter has not in the meantime withdrawn the quote, the Order is Confirmed, and each party generates a printed Deal Ticket for processing by their bank.

Figure 4:
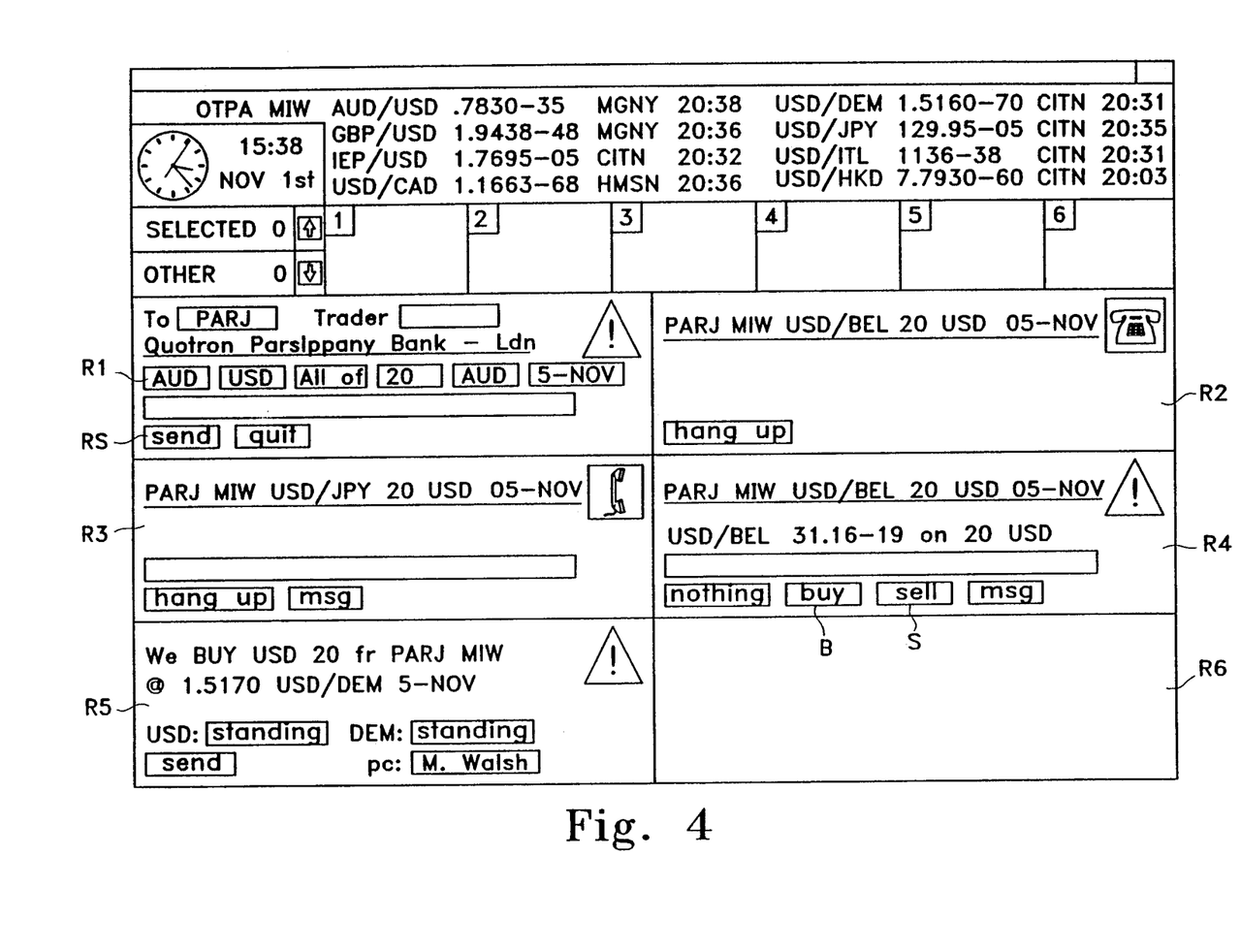
FIG. 4 shows a typical display screen of a requestor's workstation, including five panels showing five different trades initiated by the trader at various stages in the negotiation process, as well as a blank panel which could be used either for a free form conversation or even for a trade in which the trader is responding to a request from another trader.
Figure 5:
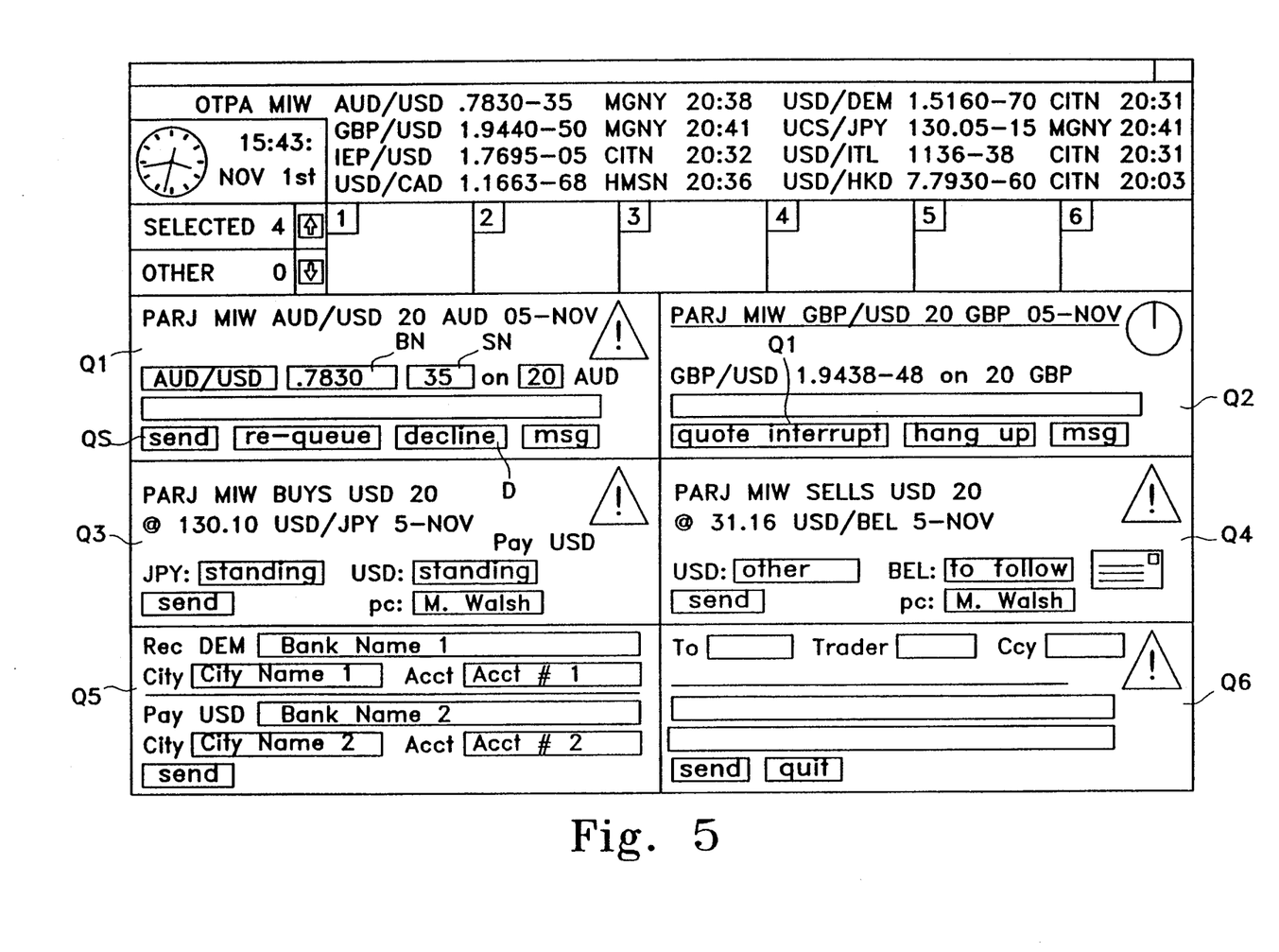
FIG. 5 shows a typical display screen of a quoter's workstation, including five panels showing five different trades directed to the trader at various stages in the negotiation process, as well as blank panel which could be used either for a free form conversation or even for a trade in which the trader is functioning as the requestor.

Accordingly, a structured message is generated for each stage in the negotiation process and, as depicted in the various "conversation panels" of FIGS. 4 and 5, a corresponding display is presented in the corresponding trading panel area of each trader's workstation screen. In particular, the requestor formulates a "Request" message (Panel P1A of FIG. 4) which he then can transmit to the designated Quoter (using his "Send" button RS), resulting in a corresponding Quote panel being displayed (Panel Q1 of FIG. 5) on the screen of whichever trader answers the incoming call. In the meantime, the requestor is presented with a Call Waiting panel (Panel R2) and, after the call has been picked up but before any Quote has been transmitted, with a Call Answered panel (Panel R3). In response, the Quoter (who may be any trader answering the call at the designated bank) may either Decline to Quote (using the "Decline" button D), or formulate a corresponding Quotation (by filling in the "Big Number" BN, "Bid Small Number" BS and "Offer Small Number" OS of Quote Panel Q1) which he then can "Send" back to the Requestor (using his "Send" button QS), whereupon the Quoter is presented with a "Quote Interrupt" panel (Panel P2B of FIG. 5). Meanwhile, the Requestor is presented with an Order panel (Panels R4 of FIG. 4) and is free to place an Order in response to the Quote (using the "Buy" button B or the "Sell" button S). Assuming an order is placed before the Quote is interrupted, both parties are presented with a Deal Summary and given the opportunity to enter their respective settlement instructions (Panels R5, Q3, Q4, Q5). In the event that the Quoter interrupts the Quote before an Order has been received (using the "Quote Interrupt" button QI), the Requestor is presented with a Quote Interrupted Panel R6, while the Quoter composes a new Quote (Panel Q6).

Since the dealers are connected together by means of a redundant dedicated message routing network, with "bank node" processors and "city node" processors for higher level supervisory functions (including security, audit and maintenance), and report generation for subsequent offline processing associated with the overall system or a particular node thereof, such as security, audit and maintenance, there are uncertainties caused by the fact that a variable time is required for an order (buy or sell) message to be transmitted from the requestor to the quoter or for a cancel (quote interrupt) message to be transmitted from the quoter to the requestor. Furthermore, it is possible that an equipment failure in the network, either in a communication link or even at the workstation of one of the traders, will prevent a small fraction of such order messages and cancel messages from reaching their intended destination within the relatively short time-frame typically associated with an on-line transaction system (a maximum of 5-8 seconds to initiate, negotiate, and conclude a single transaction).

Figure 6:
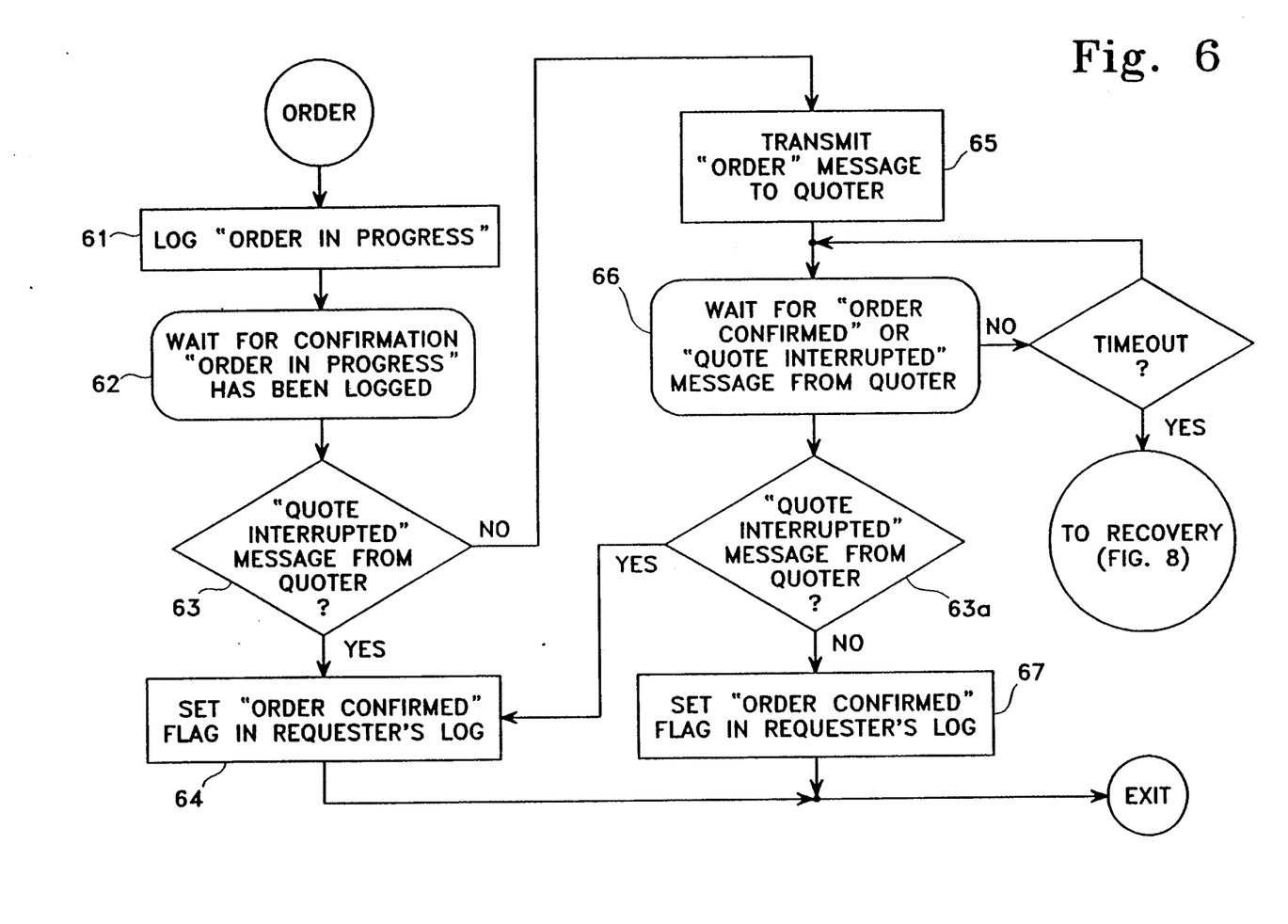
FIG. 6 is a functional flow chart for certain taker workstation functions.
Figure 7:
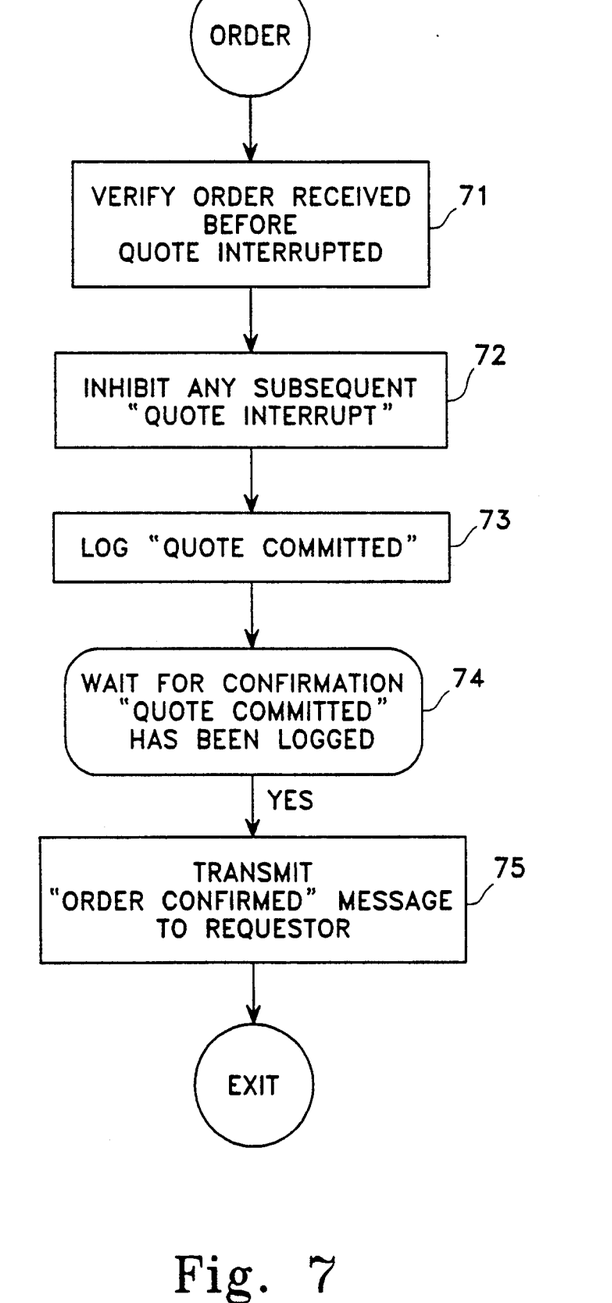
FIG. 7 is a functional flow chart for certain maker workstation functions.

Accordingly, as shown in FIGS. 6 and 7, a two-stage commitment logging process is utilized. Before any order in response to an outstanding quote is communicated to the quoter, the requestor's workstation first verifies (block 62) that its associated bank node processor has created a corresponding electronic transaction log entry designated "order in process" (block 61) before transmitting any "order" message to the quoter's workstation (block 65). Moreover, if a "quote interrupted" message is received from the quoter's workstation (Yes branch from decision block 63, 63a), the requestor's workstation is immediately inhibited from making any further response to the previously received quotation and, if there is already a corresponding "order in process" transaction log entry created by the requestor's bank node data processor, the existing entry is updated by setting an associated "order rolled back" flag (block 64).

As soon as the order message is received at the quoter's workstation and the workstation has verified that the quotation was not interrupted before the order message was received (block 71 of FIG. 7), a corresponding "quote committed" electronic transaction log entry is created at the quoter's bank node (block 73). Once the quoter's workstation has confirmed that the "quote committed" has been logged (block 74), it then transmits an "order confirmed" message to the requestor's workstation (block 75) which in turn causes the relevant "order in process" transaction log entry stored by the requestor's bank node processor to be updated by setting an associated "order confirmed" flag (blocks 66 and 67 of FIG. 6). Furthermore, the quoter's workstation is automatically inhibited from sending any "quote interrupted" message once it has received a corresponding order message (block 72).

Figure 8:
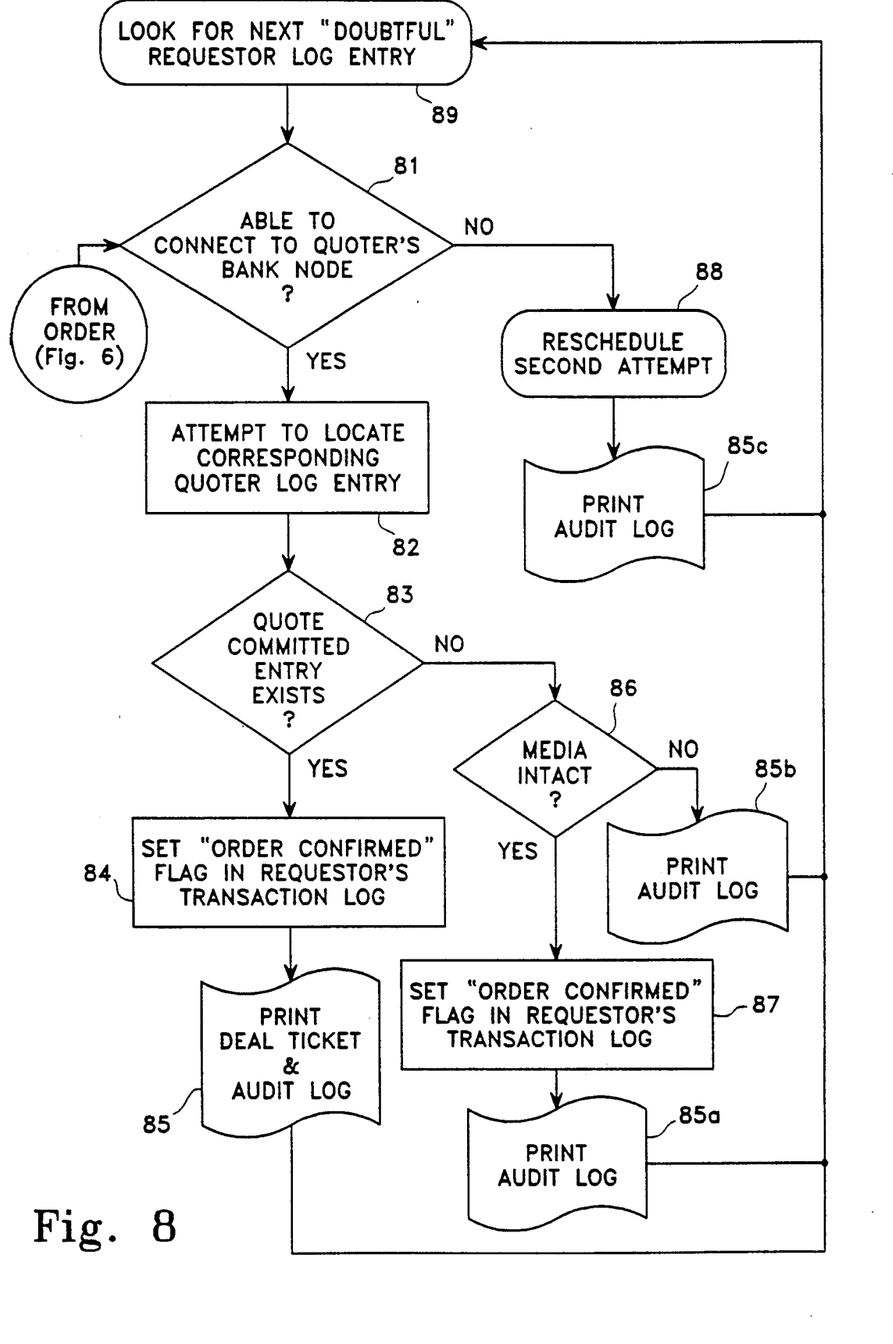
FIG. 8 is a functional flow chart for the rollback and recovery functions performed by the taker's bank node processor.

Referring again to FIG. 6, if the requestor's workstation does not receive either a "quote interrupted" or an "order confirmed" message from the quoter's workstation within a predetermined time following the logging of the transaction as "order in process" (Yes branch from decision block 68), or if it receives a communications link failure from the network, the workstation initiates a recovery attempt (block 69 and FIG. 8) by its associated bank node processor (see FIG. 8).

Assuming the requestor's bank node processor is able to establish contact with the quoter's bank node processor (Yes branch from decision block 81), it then requests an electronic copy of the relevant entry in the quoter's electronic transaction log (block 82). If the transaction is logged by the quoter as "quote committed" (Yes branch from block 83), the corresponding flag in the requestor's log is set to "order confirmed" (block 84), and the requestor and/or his bank are notified by means of a printed deal ticket and audit log entry (block 85) that the order was recovered by the system and that appropriate settlement instructions are now required. On the other hand, if the transaction log at the quoter's bank node is readable and does not contain a "quote committed" entry for the transaction in question (Yes branch from decision block 86, the order is automatically rolled back (cancelled) by the system by setting the "Rollback" flag in the requestor's transaction log (block 87), and the requestor and/or his bank are notified to that effect by means of a printed audit log entry (block 85). Alternatively, if the initial recovery attempt by the requestor's bank node fails (e.g., the quoter's bank node processor is offline, or no open communication line can be established between the two bank nodes, as indicated by No branch from decision block 81) the requestor and/or his bank are notified by means of printed audit log that the transaction is "in doubt" (block 85c) and a second recovery attempt is scheduled (block 89).

In addition to recovery attempts thus initiated by the workstation during a pending transaction, the bank node processor preferably regularly reviews (as indicated symbolically by block 89 of FIG. 8) all its transaction logs for any "doubtful" transactions which have remained designated as "order in process" for more than a few minutes (including "doubtful" transactions which were not resolved when any network failure message was originally received, and those which were the result of a failure associated with the requestor's workstation). For each of these remaining "doubtful" transactions, the requestor's bank node attempts to establish a communication link with the quoter's bank node and, if successful, proceeds as outlined previously. If, on the other hand, the requestor's bank node is not able to establish a communication link with the quoter's bank node within a predetermined period of time following the logging of the "order in process," or if it is determined that the relevant transaction log at the quoter's bank node has been replaced or rendered unreadable, the requestor and/or his bank are notified by a second printed audit log entry that automatic entry is not possible and manual resolution is required (for example, by reference to a printed audit log generated by the quoter's bank node).

It should be noted that each transaction log entry is preferably time and date stamped, and if, following reestablishment of communication with the quoter's bank node processor, no entries are present in the quoter's transaction log which were created prior to the logging of the transaction in question at the requestor's bank node, it is possible that the electronic medium containing the quoter's transaction log has been replaced or erased. This would, for example, be the case if a hardware failure were suspected in the quoter's bank node processor and/or associated logging device and the processor or the logging device was replaced by a stand-by unit. Such a possibility could be determined with certainty if information as to the physical identity of the counterparty's electronic logging device and of any associated erasable or removable storage media was available to the other bank nodes, for example, by including such data in any Quotation message and recording it as part of each transaction log entry.

Since the electronic transaction logs at each of the bank nodes is accessible only by system software, and the trader and his bank are provided with information only for transactions to which they were a party, the confidential nature of each bank's transactions with other counterparties is preserved.

It may also be noted that the above described system has the inherent capability, following a disaster involving the quoter's bank node processing equipment and any associated paper audit reports, to automatically generate a list of committed quotations made by a particular bank or trader merely by reviewing the corresponding logs at all possible counterparties for any relevant "order committed" designations.

As mentioned previously, the quoter's workstation is automatically inhibited from sending any "quote interrupted" to the requesting workstation once it has received a corresponding order message. Similarly, the requestor's workstation is automatically inhibited, in response either to a system message indicating a failure in the relevant communication link or to a specific "quote interrupted" message from the quoter's workstation, from responding to any corresponding quotation that may be outstanding, thereby altogether eliminating another potential source of disputed transactions.

It should be understood that the trader's workstation preferably is implemented as six independent-state machines, each associated with a different panel on the trader's screen, and each responsible for processing a different trading conversation in response to messages received over the network relating to that particular conversation.

Although the above-described allocation of functions between the individual trader's workstation and the bank node processor are believed to be a particularly efficient allocation in a distributed processing environment involving sensitive financial transactions, and the use of "state machine" logic and structured messages is believed to contribute greatly to the system's reliability and predictability, many of the principles underlying the invention are also applicable to other implementations and to allocations of functionality. For example, the bank node processor could be responsible for maintaining all the data for all transactions (in which case, it is believed that the system would be less modular and more difficult to expand or otherwise reconfigure), and/or the relevant transaction logs could be maintained at the individual workstations (in which case it would be more difficult maintain the security of the data, and recovery of a doubtful transaction would not be possible unless both workstations were fully operational and connected to the communications network).

We claim:

1. In an on-line automated trading system for facilitating a negotiated transaction between a maker and a taker, wherein a completed transaction includes an offer, an acceptance, and a confirmation that the acceptance was received before the offer was withdrawn:
   a communication network comprising:
      a maker node,
      a taker node, and
      a communications link connecting the maker node with the taker node;
   a maker workstation connected to said maker node;
   a taker workstation connected to said taker node;
   offer means for transmitting an offer message from the maker workstation to the taker workstation via the communications network;
   offer interruption means for transmitting an interrupt message from the maker workstation to the taker workstation indicating that a previously transmitted offer message is no longer valid;
   acceptance means for transmitting an acceptance message from the taker workstation to the maker workstation via the communications network;
   confirmation means for transmitting a confirmation message from the maker workstation to the taker workstation via the communications network indicating that a corresponding acceptance message was received at the maker workstation prior to any offer interrupt message being transmitted from the maker workstation;
   first electronic storage means connected to said taker node for storing an electronic transaction log of all said acceptance messages prior to transmission to the maker workstation, and of any corresponding said interrupt or confirmation messages after they are received by the taker workstation;
   second electronic storage means connected to said maker node for storing an electronic transaction log of any said confirmation messages prior to transmission to the taker workstation;
   taker transaction log monitoring means for automatically monitoring the first electronic storage means and identifying any doubtful transaction log entry for which no corresponding confirmation or interrupt message has been logged in the first electronic storage means within a predetermined interval of time following the logging of an acceptance message; and
   recovery means responsive to the taker transaction log monitoring means for automatically attempting to access the second electronic storage means and for updating the doubtful transaction log entry in the first electronic storage means to reflect receipt of a confirmation message if a corresponding confirmation message has been logged in the second electronic storage means.

2. The trading system of claim 1 wherein said recovery means generates a printed deal ticket indicating that the deal was recovered by the system.

3. The trading system of claim 1 further comprising rollback means responsive to the taker transaction log monitoring means for attempting to access the second electronic storage means and for updating the doubtful transaction entry in the first electronic storage means to reflect receipt of an interrupt message if the rollback means is able to determine that no corresponding confirmation message has been logged in the second electronic storage means.

4. The trading system of claim 3 wherein said recovery means generates a printed deal ticket indicating the deal was recovered by the system.

5. The trading system of claim 1 further comprising network monitoring means associated with the communications network for transmitting a network failure message to the taker workstation if the network is not able to transmit any messages from the taker workstation to the maker workstation.

6. The trading system of claim 5 further comprising order inhibiting means, associated with the taker workstation and responsive to the quote interruption means and to the network monitory means, for inhibiting any subsequent attempt to log and transmit an acceptance message from the taker workstation to the maker workstation after a quote interrupt message or a network failure message has been received by the taker workstation.

7. The trading system of claim 5 wherein said recovery means is responsive to both the network monitoring means and to the taker transaction log monitory means, and in the event that the taker transaction monitoring means indicates that an acceptance has been logged in the first electronic storage means and has not been confirmed or interrupted before a network failure message is received, immediately attempts to access any corresponding transaction log entry in the second electronic storage means.

8. The trading system of claim 1 wherein
   said maker node further comprises a plurality of workstations, including the maker workstation, each connected to a common data processor by respective communications link portions of the communications network,
   transaction log entries are recorded in said second electronic storage means by the common data processor in response to messages from the maker workstation, and
   said recovery means accesses said second electronic storage means by transmitting appropriate messages to the common data processor over the communications network.

9. The trading system of claim 8, wherein said taker node further comprises a second plurality of workstations, including the taker workstation, each connected to a second common data processor by respective communications link portion of the communications network, said first electronic storage means is controlled by the second common data processor in response to messages from the taker workstation, and said recovery means is responsive to said transaction log monitoring means, even if there is a communication failure in the communications link between said taker workstation and the second common data processor electronic transaction log, by transmitting appropriate messages to the data processor over the communications network.

10. The trading system of claim 9, wherein said communication network is a redundant, dedicated message routing network capable of establishing more than one communications link between any two nodes in the network.

11. The trading system of claim 1, wherein said transaction may also include a deal amount that is not established until after the acceptance has been confirmed, said trading system further comprises deal amount means for transmitting a message from the maker workstation to the taker workstation setting forth the deal amount, and said second electronic storage means also stores transaction log entries relating to said deal amount messages.

* * * * *